Figure 1:
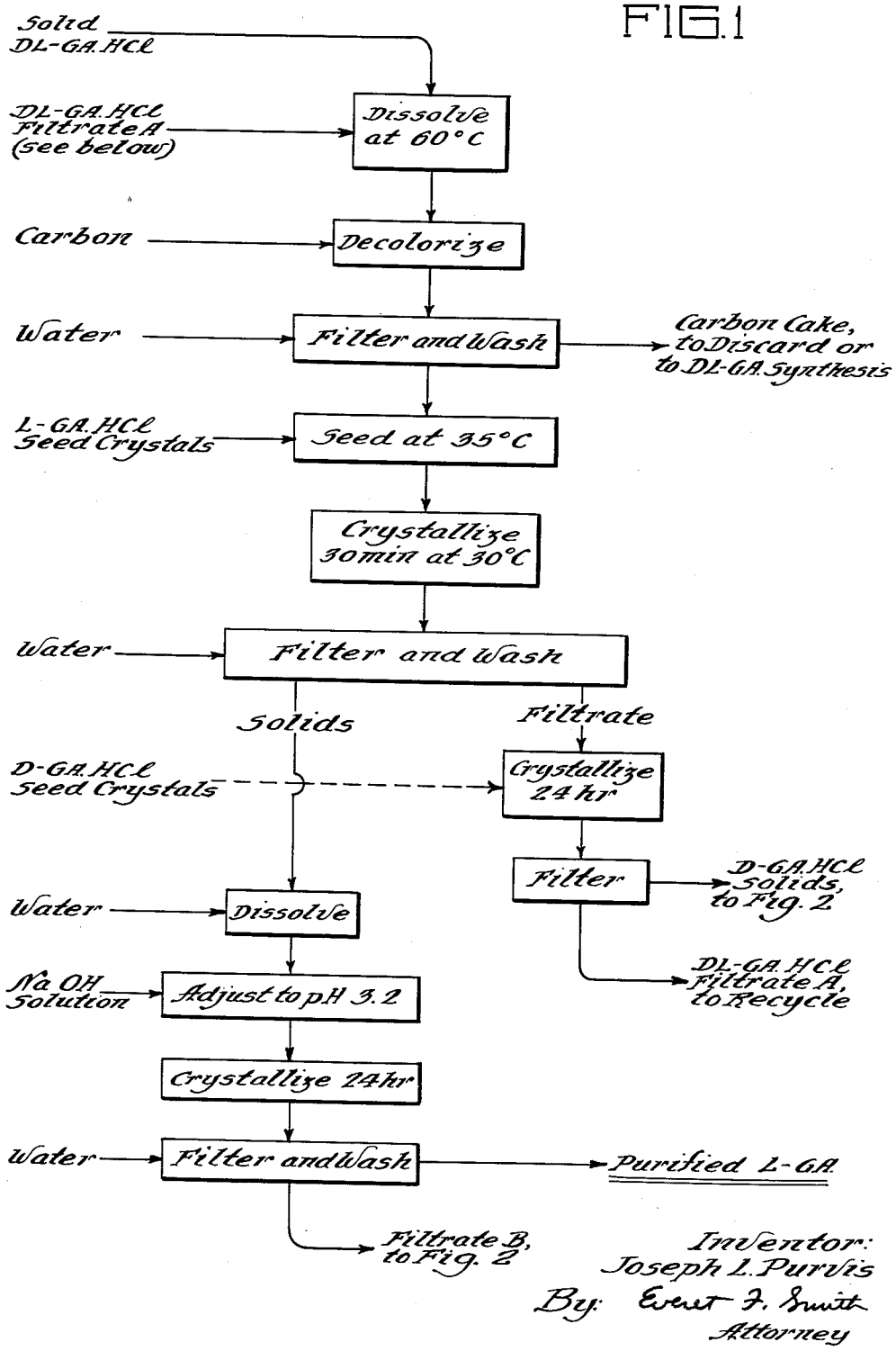

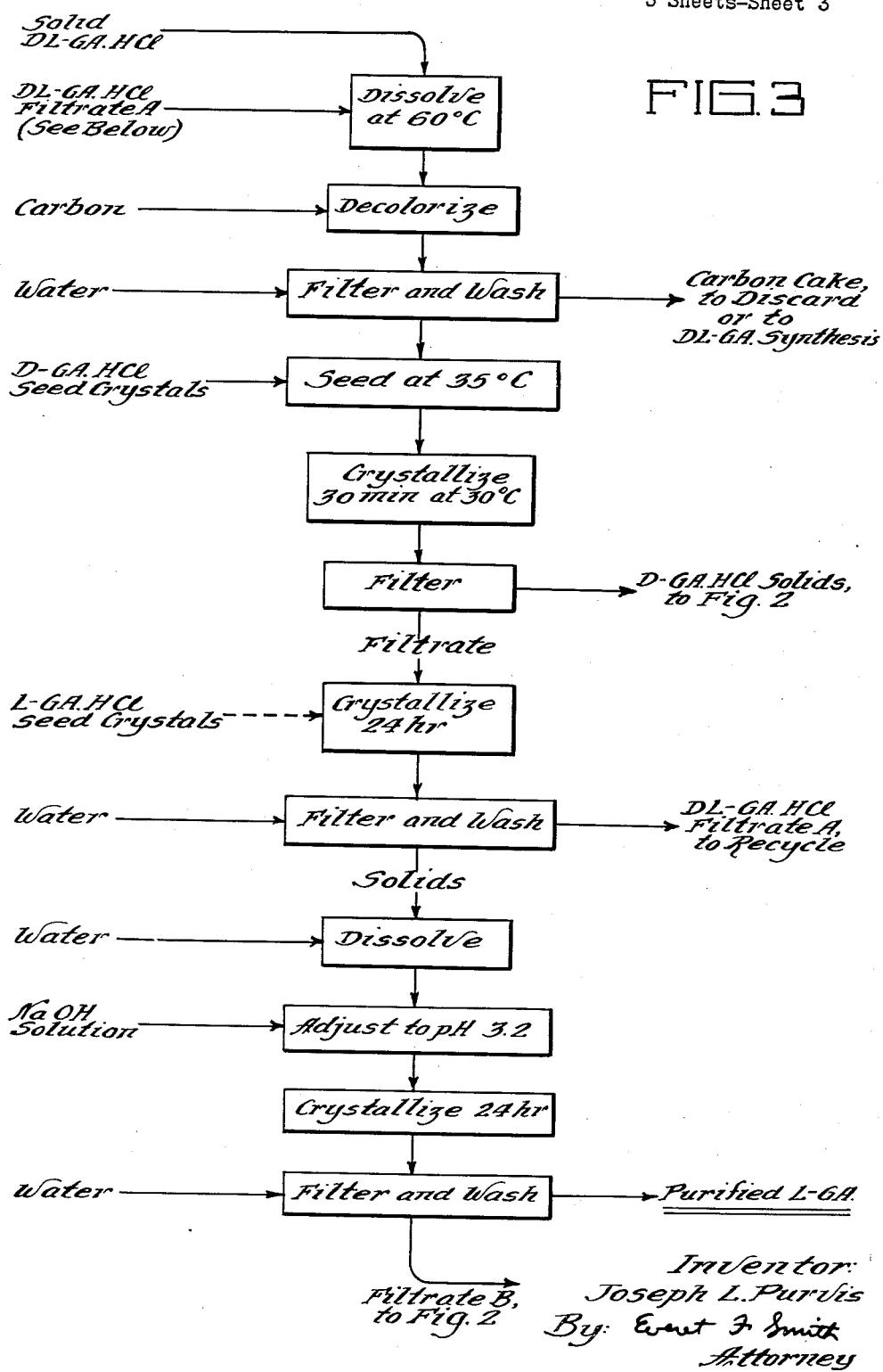

United States Patent Office 2,987,543
Patented June 6, 1961

2,987,543
RESOLUTION OF DL-GLUTAMIC ACID
Joseph L. Purvis, Norwood, Ohio, assignor to International Minerals & Chemical Corporation, a corporation of New York
Filed May 27, 1958, Ser. No. 738,161
15 Claims. (Cl. 260—534)

This invention relates to a process for resolving a mixture of the optically active isomers of an alpha-amino aliphatic dicarboxylic acid, and more particularly, to a process for resolving a racemic mixture of glutamic acid enantiomorphs.

It is well known that glutamic acid exists in D- and L- optically active forms, as well as the racemic, or DL-, form. Of these forms, only L-glutamic acid is of economic importance at the present time, there being little known utility for D- or DL-glutamic acid. Chemical processes for the synthesis of glutamic acid have invariably resulted in the formation of the racemic mixture; and in order for such processes to be commercially attractive, a simple, inexpensive method must be available for resolving the DL-glutamic acid and obtaining optically active L-glutamic acid. No such resolution method has heretofore been described in the art.

Various resolution techniques have been attempted in the past. Menozzi and Appiani (Atti R. Accad. Lincei (Roma), Rend. (5) 2, II, 415 (1893)) crystallized a mixture of D- and L-glutamic acids and manually sorted the enantiomorphs according to their crystal form. This is the classic Pasteur technique (Ann. Chim. Phys. (3) 24, 442 (1848)), of laboratory interest only. In connection with research on malignant tumors, Kogl et al. (Rec. trav. chim., 68, 387–96 (1949); C.A., 44, 1028 e) prepared a solution containing 8 parts of radioactive DL-glutamic acid hydrochloride and 4 parts of non-radioactive D-glutamic acid hydrochloride, then seeded with a few crystals of the latter, and allowed the solute to crystallize. The product, amounting to 4.1 parts, was found to be pure D-glutamic acid hydrochloride. Thus, all of the added D-glutamic acid hydrochloride was recovered, but no resolution of the racemate was effected. For resolving a number of other racemic substances, Freudenberg successfully employed selective seeding of a supersaturated solution of the racemate with crystals of one enantiomorph to produce selective crystallization of the seeded enantiomorph ("Stereochemie," Franz Deuticke, 1933, p. 566). When the Freudenberg method was tested by the present inventor in an attempt to resolve DL-glutamic acid, however, it was found that the crystalline product was heavily contaminated with the non-seeded enantiomorph, and that no commercially satisfactory separation was obtained. Accordingly, none of the methods described in the art have been found feasible for the resolution of DL-glutamic acid on a commercial scale.

A primary object of the instant invention is an effective process for separating an enantiomorph of glutamic acid from a racemic mixture of glutamic acid enantiomorphs, in which contamination of the product with the undesired enantiomorph is avoided.

Another object is to provide an economical, commercially feasible process for the resolution of DL-glutamic acid.

A further object is to provide a process for the resolution of racemic glutamic acid mixtures which does not require the use of expensive reagents.

Other objects will be apparent from the present description and claims.

In accordance with the present invention, a racemic glutamic acid mixture can be successfully resolved by seeding a supersaturated aqueous solution thereof with crystals of one glutamic acid enantiomorph, thereby initiating selective crystallization of the said enantiomorph, and terminating the crystallization after a limited period of time, preferably not substantially later than the time at which maximum resolution occurs, and in any event before spontaneous nucleation and crystallization of the non-seeded enantiomorph occur to any substantial extent. Generally, the point for terminating the crystallization will be reached in about 1 to about 60 minutes after initiation thereof, most commonly in about 10 to about 60 minutes, depending upon such factors as solution temperature, solute concentration and degree of supersaturation, proportion of seed crystals, surface area of seed crystals, and the like. In general, the time required to reach maximum resolution varies directly as a function of the solution temperature and inversely as a function of the proportion of seed crystals. By thus terminating the crystallization after a limited time, contamination of the product with the non-seeded enantiomorph is substantially completely avoided, and a high yield of the seeded enantiomorph in substantially pure form is obtained.

The critical behavior of DL-glutamic acid in the process of the present invention is completely unexpected in view of Freudenberg. In studying the resolution of sodium ammonium DL-tartrate by selective seeding, Freudenberg reported that, after selective crystallization of the seeded enantiomorph had been initiated, the solubility of the enantiomer increased, and consequently there was no further reason for the latter to crystallize. In accordance with the present invention, it has been found that DL-glutamic acid behaves entirely differently. After a supersaturated solution of DL-glutamic acid has been selectively seeded, the seeded enantiomorph crystallizes, but the crystallization of the non-seeded enantiomorph is not thereby inhibited. To the contrary, the non-seeded enantiomorph also crystallizes, apparently through spontaneous nucleation, initiated in some unsascertained way. In investigating this phenomenon, it was discovered that the undesired spontaneous crystallization does not begin immediately after seeding, but only after an induction period which normally ranges from about 1 to about 60 minutes. Within this period the degree of resolution of the seeded enantiomorph rises to a maximum, then rapidly drops off as the non-seeded enantiomorph begins to crystallize. It is therefore critically necessary in achieving a high degree of resolution that the crystallization be terminated within such limited period, before any substantial amount of the non-seeded enantiomorph has spontaneously crystallized. It is especially preferred to terminate the crystallization as soon as the degree of resolution levels off, this point being readily determined by measuring the optical activity of the residual solution. The optical rotation of the residual solution changes in the opposite direction to that of the solids, and clearly indicates when crystallization of the seeded enantiomorph has undesirably slowed and spontaneous crystallization of the unseeded enantiomorph is imminent.

The present invention is effective for resolving free DL-glutamic acid, DL-glutamic acid hydrochloride, or DL-glutamic acid hydrobromide, employing in each case seed crystals of the particular compound in substantially pure D- or L-form as desired, and preferably operating at the natural pH of the particular compound under the solution conditions.

The "degree of resolution," as this term is used herein, refers to the proportion of the enantiomorph preferentially crystallized in optically active form from the racemic solution, based upon the quantity of such enantiomorph originally present in the racemate. The degree of resolution, R, is calculated as a percentage according to the following equation:

$$R = \frac{100(W - 2A - S)}{B}$$

where W is the total weight of the solids obtained in the preferential crystallization, A is the weight of contaminating enantiomorph therein, S is the weight of seed crystals employed, and B is the weight of the seeded enantiomorph in the original racemate, all weights being on dry basis.

In resolving free DL-glutamic acid, a supersaturated solution of the free acid is prepared in any convenient manner. For example, DL-glutamic acid monohydrate can be slurried in water in the presence of a sufficient quantity of inorganic acid such as hydrochloric acid or sulfuric acid to produce complete solution, and the pH of the resulting solution can then be adjusted to around 3.2 (the isoelectric point of free glutamic acid) by adding alkali such as sodium hydroxide, calcium hydroxide, ammonium hydroxide, or the like. Alternatively, DL-glutamic acid monohydrate can be slurried in water in the presence of a sufficient quantity of alkali to produce complete solution, and the pH of the resulting solution can be adjusted to around 3.2 by adding inorganic acid.

The concentration of DL-glutamic acid in the resulting supersaturated solution will generally range between about 1.5 and about 8% by weight at temperatures between about 15 and about 40° C., varying as a direct function therewith, and will preferably range between about 2 and about 6% by weight, depending upon the desired degree of supersaturation. At room temperature (20 to 30° C.) the concentration will usually lie in the range of about 3 to about 4% by weight. The concentration of the solution should preferably be such that the desired enantiomorph is present in a concentration from about 10 to about 100% in excess of the saturation level under the existing temperature conditions, optimally between about 25 and about 50%.

To the solution thus formed is added a quantity of optically active glutamic acid seed crystals, that is, either L-glutamic acid or D-glutamic acid, the quantity of seed crystals being preferably in the proportion of at least about 5% by weight of the seeded enantiomorph in the solution, optimally between about 25 and about 50% by weight. The solution is then agitated gently to assist crystallization. The crystallization is suitably carried out at moderate temperatures, between about 15 and about 40° C., the rate of crystal formation being greater at the lower temperatures. The operation is most conveniently carried out at ordinary temperatures in the range of about 20 to about 30° C., in which range a high degree of resolution is achieved without complications. The degree of resolution ordinarily reaches a maximum in from about 10 to about 60 minutes, depending primarily upon the concentration of the solution, the temperature, the degree of supersaturation, and the proportion and surface area of the seed crystals, at which point the crystallization is terminated by filtration, centrifugation, or the like. The crystallized solids comprise, in addition to the seed crystals, a substantial proportion of the optically active form of glutamic acid present in the starting mixture which corresponds in rotation to that of the seed crystals.

In resolving DL-glutamic acid hydrochloride, a solution supersaturated therewith and having a pH below about 0.6 is conveniently prepared by commingling DL-glutamic acid hydrochloride with water at a temperature sufficiently high to effect complete dissolution, then cooling to the desired resolution temperature, between about 15 and about 40° C., optimally around 20 to 30° C. This is the preferred type of solution for the present invention, containing from about 40 to about 55% by weight of DL-glutamic acid hydrochloride, varying as a direct function of the temperature and containing substantially no free hydrogen chloride. Alternatively, a solution can be prepared if desired by dissolving from about 5 to about 55% by weight of DL-glutamic acid hydrochloride in water and adding a sufficient quantity of hydrogen chloride or concentrated hydrochloric acid to render the solution supersaturated. As a further alternative, DL-glutamic acid monohydrate can be dissolved in dilute hydrochloric acid to yield the hydrochloride salt solution, and hydrogen chloride or concentrated hydrochloric acid is thereafter added. The proportion of free hydrogen chloride in such a solution may range up to around 30% by weight. The degree of supersaturation of the desired enantiomorph should be in the range of about 10 to about 100%, based on the saturation level, preferably between about 30 and about 60%. The supersaturated solution is seeded with crystals of L-glutamic acid hydrochloride or D-glutamic acid hydrochloride, and crystallization of the seeded enantiomorph is carried out as described above with reference to the resolution of free DL-glutamic acid. The proportion of seed crystals is suitably at least about 1% by weight, preferably around 5 to 10%, based on the weight of the seeded enantiomorph in the solution, when the solution contains no free hydrogen halide, and at least about 5% by weight, preferably between about 25 and about 50%, when the solution contains free hydrogen halide to produce supersaturation.

The resolution of DL-glutamic acid hydrobromide is carried out in a manner similar to that employed for the hydrochloride.

It has been found that the highest yield of resolved product per unit weight of starting solution is obtained in a DL-glutamic acid hydrochloride system containing no excess hydrogen chloride. The following represents a highly advantageous procedure and set of operating conditions for the preferential crystallization of the L-isomer from the racemic solution: A solution containing 52% by weight of DL-glutamic acid hydrochloride is seeded with pure L-glutamic acid hydrochloride crystals and stirred gently at 30° C. The seed crystals (−200 mesh, U.S. Standard Sieve Series) are added in an amount equivalent to 5% by weight of the L-glutamic acid hydrochloride in the solution. At the end of 30 minutes, the crystallization is terminated by filtration, and the seed crystals are recovered, together with about 32% of the L-glutamic acid hydrochloride originally in the solution. The crystals contain about 99% by weight L-isomer and about 1% D-isomer. They can readily be purified by dissolving in water, adjusting to pH 3.2 with alkali, and crystallizing free L-glutamic acid. In this way, a purity closely approaching 100% is readily attainable.

The preferential crystallization method of the present invention is capable, at best, of resolving only the portion of the seeded enantiomorph which is supersaturated in the starting solution, leaving in every case a considerable quantity of the racemic mixture in the residual solution, together with the non-seeded enantiomorph. For economic reasons, therefore, it is important to employ some means for recovering these glutamic acid values. For this purpose, the following technique has been developed (which for convenience will be described with reference to a process in which L-glutamic acid was the enantiomorph initially seeded and crystallized). From the resulting L-glutamic acid mother liquor is crystallized the supersaturated D-glutamic acid, substantially equivalent to the L-isomer previously removed. The remaining solution of racemic glutamic acid is recycled to the beginning of the process. The D-isomer is converted to the racemic form by means well known to the art, and the racemate is recycled to the beginning of the process for additional L-glutamic acid recovery.

The proportion of seed crystals may vary over a wide range. Some degree of resolution can be obtained with a very small quantity of seed crystals, e.g., as little as 0.5% by weight, based on the DL-glutamic acid substance in solution, especially when the crystals are of small size. For any given solution and resolution temperature, however, there is an optimum proportion of seed crystals which will produce the maximum degree of resolution. For example, in resolving a solution containing 4.98% DL-glutamic acid hydrochloride and 25% of free hydrogen chloride at 25° C., the minimum amount of seed crystals required to achieve maximum crystallization of L-glutamic acid hydrochloride is equivalent to approximately 100% of the L-glutamic acid hydrochloride in the solution. Greater proportions of seed crystals increase the rate of crystallization substantially, but increase the degree of resolution very little. Smaller proportions result in both a slower crystallization rate and a lower degree of resolution. Inasmuch as the non-seeded enantiomorph tends to crystallize after a limited time and to contaminate the seeded enantiomorph, the seed crystals must be employed in a sufficient proportion, as defined hereinabove, to produce the desired crystallization within less than such time.

The rate of resolution in the process of the invention is considerably influenced by the size of the seed crystals. In general, the effectiveness of the seed crystals per unit weight increases greatly as the crystal size decreases. Thus, it is reasonable to conclude that the effects of both the size and the quantity of the seed crystals are directly related to the total surface area thereof in any given case. It has been observed, for example, that a given amount of finely ground seed crystals of $-200$ mesh particle size range produced a faster rate of resolution and also a slightly higher degree of resolution than the same weight of the original unground crystals, which consisted of a mixture of sizes with approximately 70% in the $+60$ mesh range.

DL-glutamic acid may be prepared by any suitable process, such as, for example, by the method disclosed in U.S. Patent 2,606,921 to Weisblat and Lyttle (August 12, 1952).

The supersaturated solutions of DL-glutamic acid, DL-glutamic acid hydrochloride, or DL-glutamic acid hydrobromide utilized in carrying out this invention may be prepared in any convenient manner. Monosodium DL-glutamate dihydrate, monoammonium DL-glutamate, monopotassium DL-glutamate, DL-glutamic acid monohydrate, DL-glutamic acid hydrochloride, DL-glutamic acid hydrobromide, and other soluble metallic salts and acidic salts can be utilized satisfactorily in preparing these solutions.

The attached flow sheets represent integrated processes embodying the invention for the complete resolution of DL-glutamic acid hydrochloride to produce L-glutamic acid hydrochloride. The same procedures can be employed with appropriate modifications to produce D-glutamic acid hydrochloride, if desired; and with other appropriate modifications the procedures can be employed for the resolution of DL-glutamic acid and of DL-glutamic acid hydrobromide. Such modifications will be obvious to those skilled in the art from the present description.

Figure 2:
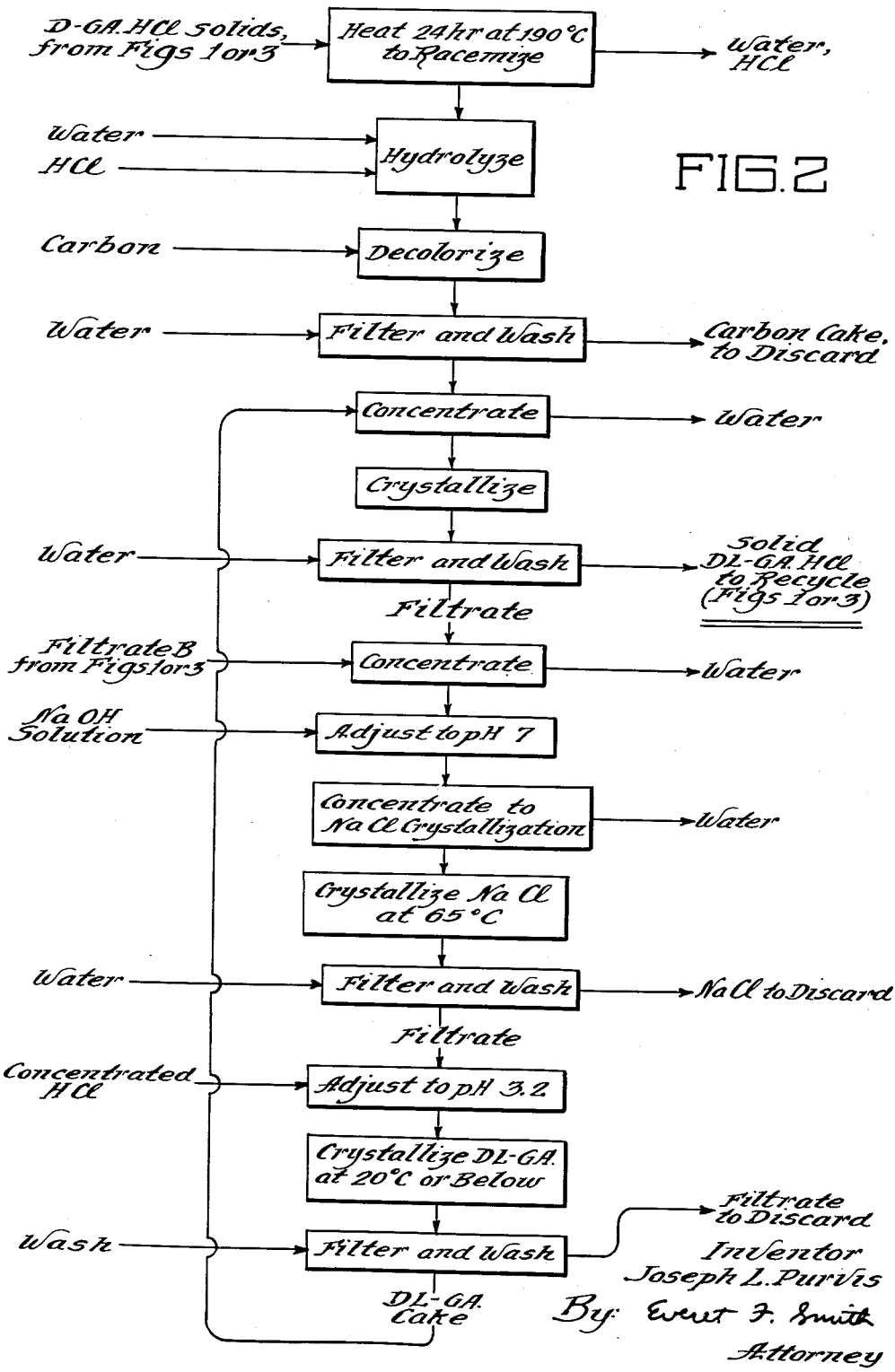

FIGURES 1 and 2 represent a process in which L-glutamic acid hydrochloride is first selectively seeded, crystallized, and separated, and the mother liquor is treated to recover the remaining glutamic acid values for recycle.

FIGURE 3, in conjunction with FIGURE 2, represents a process in which D-glutamic acid hydrochloride is first selectively seeded, crystallized, and removed, and L-glutamic acid hydrochloride is recovered as the desired primary product in essentially pure form by crystallization from the mother liquor.

Referring now to FIGURE 1, 7.27 lb. of solid DL-glutamic acid hydrochloride (referred to hereinafter for convenience as "DL-GA.HCl") are dissolved at about 60° C. in 31.15 lb. of Filtrate A from a subsequent step in the process, containing dissolved DL-GA.HCl. The resulting solution, weighing 38.4 lb., contains 20.4 lb. of DL-GA.HCl. The solution is decolorized, if desired, by adding 0.8 lb. of activated carbon, stirring, filtering, and washing with 1.0 lb. of water. The carbon cake is discarded or used to purify crude synthetic glutamic acid. The filtrate and washings are combined and cooled. At 35° C., the solution is seeded with 0.456 lb. of L-GA.HCl seed crystals of $-200 +325$ mesh size. Cooling is continued with gentle stirring to 30° C. At the end of 30 minutes after seeding, the mixture is filtered rapidly and the filter cake is washed if desired with a small proportion of water, yielding 4.65 lb. of wet solids containing 3.891 lb. of L-GA.HCl and 0.264 lb. of D-GA.HCl. The cake is dissolved in 27.43 lb. of water, and the pH of the solution is adjusted to 3.2 with 1.81 lb. of aqueous 50% sodium hydroxide solution. The solution is allowed to stand with stirring about 24 hours at 30° C. while crystallization of purified L-glutamic acid proceeds, and the resulting slurry is filtered. The solids are washed with 5.0 lb. of water, yielding a wet cake equivalent to 3.627 lb. of dry L-GA.HCl, substantially free from the D-isomer. Of these solids, a portion equivalent to 0.562 lb. of L-GA.HCl is withdrawn for use in seed preparation. The remainder, 3.06 lb., calculated as L-GA.HCl, represents the yield of purified L-isomer from the process. The combined filtrate and washings (termed "Filtrate B" in the drawing) are further processed as shown in FIGURE 2.

The filtrate, weighing 35.1 lb., from the first L-GA.HCl crystallization is stirred gently for 24 hours at 30° C., during which time the D-GA.HCl spontaneously nucleates and crystallizes. Seed crystals of D-GA.HCl may be added if desired, to speed the process. The resulting slurry is filtered. The filtrate (designated "Filtrate A" in the drawing, and weighing 31.15 lb.) is recycled to the beginning of the process, as described above. The solids, weighing 3.96 lb. in wet condition and containing 3.366 lb. of D-GA.HCl plus 0.196 lb. of L-GA.HCl, are further processed as described in FIGURE 2.

Referring to FIGURE 2, the D-GA.HCl solids from FIGURE 1 are heated at 190° C. for 24 hours to effect racemization thereof. The resulting racemate is dissolved in water, adjusted to below pH 0.6 by adding an equivalent quantity of concentrated hydrochloric acid, and heated at the boiling point for 2 hours to hydrolyze the glutamic acid precursors therein. The resulting solution of DL-GA.HCl is decolorized with activated carbon, then combined with a DL-GA cake from later in the process, and concentrated and cooled to permit crystallization of DL-GA.HCl. The DL-GA.HCl is filtered off and washed, and the material thus recovered (3.335 lb.) is recycled to the beginning of the process.

The L-GA mother liquor and washings ("Filtrate B" in FIGURE 1), containing DL-glutamic acid equivalent to 0.528 lb. DL-GA.HCl, are optionally combined with the DL-GA.HCl mother liquor and washings, then concentrated to 5 lb., adjusted to pH 7.0 with 0.230 lb. of aqueous 50% NaOH solution, and further concentrated to the point of incipient NaCl crystallization. The NaCl is crystallized at 65° C., filtered off (0.4 lb.), and discarded. The filtrate is adjusted to pH 3.2 with 0.284 lb. of 37% hydrochloric acid, and DL-GA is allowed to crystallize at 20° C. for 24 hours. The DL-GA is filtered off, washed with a small amount of water, and recycled as noted above for further treatment with the racemized D-GA.HCl solids. The filtrate and washings, containing NaCl and glutamic acid values equivalent to only 0.106 lb. of DL-GA.HCl, are discarded.

FIGURE 3 illustrates an advantageous modification of the invention in which D-GA.HCl is first selectively seeded, crystallized, and separated, and L-GA.HCl is thereafter crystallized. By removing the D-isomer supersaturation first, the D-isomer is prevented from contaminating the L-isomer during the subsequent crystallization thereof. With the exception of the reverse order of crystallization, the modified process generally follows the process of FIGURES 1 and 2. Solid DL-GA.HCl is dissolved in recycled DL-GA.HCl solution ("Filtrate A"). The solution is cooled, seeded with crystals of D-GA.HCl, and allowed to crystallize for a limited period as in FIGURE 1, suitably until the D-GA.HCl supersaturation approaches or reaches exhaustion, the crystallization being stopped, however, before any substantial proportion of the L-isomer crystallizes. The D-GA.HCl solids are then separated and further processed as in FIGURE 2. From the mother liquor, L-GA.HCl is crystallized, optionally after seeding with L-GA.HCl crystals. The L-GA.HCl is filtered off, and the mother liquor ("DL-GA.HCl Filtrate A") is recycled to the beginning of the process. The solids are substantially pure L-GA.HCl, which can be further purified by the simple recrystallization involved in converting from the hydrochloride salt to free L-GA. This is done by dissolving the L-GA.HCl in water, adjusting the solution to pH 3.2 with sodium hydroxide solution, crystallizing, filtering, and washing. The product is substantially pure L-GA. The mother liquor ("Filtrate B") contains a quantity of DL-GA, and is recycled to FIGURE 2.

The following examples illustrate specific embodiments of this invention. All parts and percentages are by weight unless otherwise indicated.

*Example 1*

The following data illustrate the way in which the degree of resolution varies with the time of crystallization in the present invention. In the test reported, an aqueous solution containing 9.96% of DL-glutamic acid hydrochloric and 18% excess hydrochloric acid was prepared by slurrying the required amount of DL-glutamic acid monohydrate in water and adding a sufficient quantity of concentrated (37%) hydrochloric acid to dissolve the material and to supersaturate the solution. To the resulting solution, adjusted to 30° C., were added 25% of unsized crystals of L-glutamic acid hydrochloride, based upon the L-gultamic acid hydrochloride in the solution, about 70% of the said crystals being in the +60 mesh range. The crystallization period was measured from the time that the addition of the L-glutamic acid hydrochloride crystals was completed. The solution was agitated gently throughout the crystallization period, and samples were withdrawn from time to time for analysis and for calculation of the degree of resolution. The results were as follows:

| Time, min.: | Resolution, percent |
|---|---|
| 5 | 17.4 |
| 15 | 29.8 |
| 36 | 32.2 |
| 45 | 33.5 |
| 60 | 11.8 |
| 110 | 3.7 |

*Example 2*

The following data further illustrate the way in which the degree of resolution varies with the time of crystallization in the process of the present invention. In the reported test, 525 parts of a saturated solution DL-glutamic acid prepared from 21.2 parts DL-glutamic acid monohydrate and having a pH of about 3.2 was seeded at 30° C. by admixing therewith about 10 parts of pure, unscreened L-glutamic acid crystals having about 70% in the +60 mesh range. The crystallization mixture was sampled from time to time as in the previous example to determine the degree of resolution. The results were as follows:

| Time, min.: | Resolution, percent |
|---|---|
| 10 | 10.7 |
| 20 | 18.1 |
| 30 | 26.0 |
| 40 | 26.0 |
| 50 | 26.0 |
| 60 | 26.0 |
| 80 | 10.7 |

Two of the factors which influence the amount and the rate of crystallization of optically active glutamic acid from seeded solutions of the racemate are the concentration and the degree of supersaturation of the racemate in the solution. DL-GA.HCl, for example, is most soluble in an aqueous solution containing no free HCl, and becomes decreasingly soluble as free HCl is added in increasing concentrations. At higher concentrations of DL-GA.HCl, a larger weight yield of seeded enantiomorph per unit weight of solution is obtained, whereas at lower concentrations, in a more acidic solution, a higher percentage yield (referred to generally herein as "degree of resolution") is obtained. These phenomena are illustrated by the following example.

*Example 3*

A solution containing 52% by weight of DL-GA.HCl and no excess HCl is seeded with 10% by weight of −200 mesh L-GA.HCl crystals, based on the L-GA.HCl in solution, and L-GA.HCl is crystallized at 30° C. The resolution reaches a maximum in about 30 minutes, and the crystalline product corresponds to about 8 parts by weight of L-GA.HCl per 100 parts of solution, equivalent to 31% resolution.

A solution containing 4.44% by weight of DL-GA.HCl and a 25% excess of HCl is similarly seeded and crystallized. In this case also, the resolution reaches a maximum in about 30 minutes, but the product corresponds to only about 1.1 part by weight of L-GA.HCl per 100 parts of solution. On the other hand, this represents 50% resolution.

*Example 4*

To illustrate the effect of the degree of supersaturation on the rate as well as the extent of crystallization, DL-GA.HCl solutions at two supersaturation levels were seeded with 5% by weight of −200 mesh L-GA.HCl crystals, based on the weight of L-GA.HCl in solution, and crystallization was carried out at 30° C. The results were as follows:

| | | |
|---|---|---|
| DL-GA. HCl conc'n, wt.-percent | 52 | 55 |
| DL-GA. HCl supersaturation, percent of of saturation | 20.4 | 27.3 |
| | Degree of Resolution, Percent | |
| Time, min: | | |
| 5 | 13.5 | 26.2 |
| 10 | 20.45 | 34.6 |
| 20 | 27.55 | 22.95 |
| 30 | 30.85 | |
| 40 | 30.3 | 6.14 |
| 50 | 22.8 | |

*Example 5*

A further factor which influences the resolution of DL-glutamic acid is the proportion of seed crystals used to induce crystallization. In a series of tests at 25° C. on solutions containing 4.98% by weight of DL-GA.HCl and 25% excess HCl, it was found that maximum resolution of L-GA.HCl was obtained by seeding with 100% of L-GA.HCl crystals based on the weight of L-GA.HCl in the racemic solution, the seed crystals having the following screen analysis:

| Mesh | Percent |
|---|---|
| +40 | 44.4 |
| 40–60 | 25.4 |
| 60–100 | 21 |
| −100 | 9.3 |

From the resulting data, tabulated below, it is seen that greater proportions of seed crystals increase the rate of crystallization substantially, but increase the extent of crystallization very little. Lower proportions of seed crystals result in both slower rates and lower degrees of crystallization.

| Seed proportion, percent | 9 | 18 | 36 | 90 | 200 | 300 |
|---|---|---|---|---|---|---|
| | | | Degree of Resolution, Percent | | | |
| Time, min.: | | | | | | |
| 1 | | | | | | 37.2 |
| 3 | | | | | | 41.0 |
| 5 | | | | | 35.9 | 45.9 |
| 8 | | | | | | 48.4 |
| 10 | | | | | 44.5 | 47.0 |
| 15 | | | | 37.5 | | |
| 20 | 22.4 | 33.4 | 38.9 | | 48.3 | |
| 25 | | | | 44.5 | 45.9 | |
| 30 | 29.8 | | 43.1 | | 37.2 | |
| 35 | | 37.2 | | 47.3 | 27.3 | 24.8 |
| 40 | 37.2 | | 41.6 | | 18.6 | |
| 50 | | | | 44.5 | | |
| 55 | 34.7 | 27.3 | | | | |

Example 6

About 28 parts of DL-glutamic acid monohydrate were slurried in about 122 parts of water and dissolved by addition of about 25 parts of 37% hydrochloric acid. After the DL-glutamic acid monohydrate was completely dissolved, an additional 325 parts of 37% hydrochloric acid were added, so that the final solution amounted to 500 parts and contained about 26% hydrogen chloride. Immediately after the final addition of hydrochloric acid, about 10 parts of unsized L-glutamic acid hydrochloride crystals were added and the slurry was agitated slowly to permit crystallization of solids from solution. After about 16 minutes of crystallization time the crystals were removed from the slurry by filtration. The resolution of the DL-glutamic acid by this procedure amounted to 59%.

Example 7

About 51.3 parts of monosodium DL-glutamate dihydrate were dissolved in 700 parts of water at 25° C. The solution was adjusted to pH 3.2 by addition of sufficient 37% hydrochloric acid. To this solution, which was supersaturated with respect to DL-glutamic acid, were immediately added about 9.2 parts of pure, unsized L-glutamic acid crystals, and the resulting slurry was agitated slowly for about 15 minutes. At the end of this time the slurry was filtered rapidly to recover the seed crystals and the additional crystals which had formed. The dried crystals amounted to about 16.2 parts by weight and contained 96% L-glutamic acid.

Example 8

About 21.2 parts of DL-glutamic acid monohydrate were dissolved in water in the presence of about 6 parts of sulfuric acid and the solution was diluted with water to 500 parts. The pH of the solution was then adjusted to about 3.2 by addition of a sufficient quantity of a 33% aqueous slurry of calcium hydroxide. The temperature of the adjusted solution was 30° C. Pure, unsized L-glutamic acid crystals in the amount of about 10 parts were then added to the adjusted solution immediately and gentle agitation was begun to permit crystallization of solids. After about 30 minutes the crystals were removed by filtration and analyzed. The resolution of the DL-glutamic acid by this procedure amounted to 32%.

The invention described and claimed in the present application is fully described in my earlier applications, Serial No. 475,297, filed December 14, 1954, now abandoned, and Serial No. 599,358, filed July 23, 1956, now abandoned, the latter having been copendent with both the later-filed present application and the earlier-filed Serial No. 475,297. The present application is accordingly a continuation-in-part of Serial No. 599,358, and, through the latter, of Serial No. 475,297.

In accordance with the foregoing description, the following claims particularly point out and distinctly claim the subject matter of the present invention:

1. A process for resolving a DL-glutamic acid compound selected from the group consisting of DL-glutamic acid, DL-glutamic acid hydrochloride, and DL-glutamic acid hydrobromide, which comprises adding seed crystals of said glutamic acid compound in one of its optically active forms to an aqueous solution containing said DL-glutamic acid compound at a supersaturation of at least about 10%, based on the saturation level, the proportion of seed crystals being at least about 1% by weight of the seeded enantiomorph in the solution in the case of the said DL-glutamic acid hydrohalides wherein the corresponding hydrogen halide is present in free form, and at least about 5% by weight of the seeded enantiomorph in the solution in the case of solutions containing said DL-glutamic acid compound without free hydrogen halide; crystallizing solids from the solution, said crystallized solids being initially said glutamic acid compound of optical activity corresponding to the seed crystals, and separating the crystallized solids from the resulting slurry before spontaneous nucleation and crystallization of any substantial proportion of the non-seeded enantiomorph takes place and at a point in time not substantially later than the attainment of the maximum degree of resolution R, calculated as $$R = \frac{100(W - 2A - S)}{B}$$

where W is the total weight of crystallized solids, A is the weight of non-seeded enantiomorph therein, S is the weight of seed crystals added to the solution, and B is the weight of the seeded enantiomorph initially in the solution, all weights being on dry basis.

2. A process as in claim 1 wherein the crystallized solids are separated from the resulting slurry within about 1 to about 60 minutes following initiation of crystallization.

3. A process as in claim 2 wherein said crystallization is carried out at the natural pH of said glutamic acid compound under the solution conditions.

4. A process as in claim 3 wherein glutamic acid hydrobromide is preferentially crystallized in optically active form at a pH below about 0.6 from a supersaturated solution of racemic glutamic acid hydrobromide.

5. A process as in claim 4 wherein said solution contains hydrogen bromide in free form.

6. A process as in claim 3 wherein optically active glutamic acid is preferentially crystallized from a supersaturated solution of DL-glutamic acid at a pH around 3.2.

7. A process as in claim 3 wherein glutamic acid hydrochloride is preferentially crystallized in optically active form at a pH below about 0.6 from a supersaturated solution of racemic glutamic acid hydrochloride.

8. A process as in claim 7 wherein said solution contains hydrogen chloride in free form.

9. A process for resolving DL-glutamic acid which comprises adding crystals of glutamic acid in one of its optically active forms to a supersaturated solution of DL-glutamic acid wherein the concentration of DL-glutamic acid is between about 10 and about 100% greater than the saturation level, the proportion of said added crystals being at least about 5% by weight, based on the weight of the seeded enantiomorph in said solution, crystallizing the enantiomorph corresponding to said crystals from the solution at a temperature between about 15 and about 40° C. and a pH of about 3.2, and separating the crystallized enantiomorph from the resulting slurry within about 10 to about 60 minutes following initiation of crystallization to terminate crystallization within a period of time not substantially greater than that in which maximum resolution is reached and to prevent contamination of the seeded enantiomorph by spontaneous crystallization of its enantiomer.

10. A process for resolving DL-glutamic acid which comprises preparing an aqueous solution thereof containing DL-glutamic acid at a concentration between between about 25 and about 50% greater than the saturation level, adding thereto between about 25 and about 50% of L-glutamic acid crystals based on the weight of DL-glutamic acid in the solution, crystallizing L-glutamic acid from the solution at a temperature between about 20 and about 30° C. and a pH around 3.2, and separating the L-glutamic acid crystals from the resulting slurry within about 10 to about 60 minutes following initiation of crystallization to terminate crystallization within a period of time not substantially greater than that in which maximum resolution is reached and to prevent contamination of the L-glutamic acid by spontaneous crystallization of D-glutamic acid.

11. A process for resolving DL-glutamic acid hydrochloride which comprises adding crystals of glutamic acid hydrochloride in one of its optically active forms to a supersaturated solution of DL-glutamic acid hydrochloride wherein the concentration of DL-glutamic acid hydrochloride is between about 10 and about 100% greater than the saturation level, the proportion of said added crystals being at least about 1% by weight, based on the weight of the seeded enantiomorph in said solution, crystallizing the enantiomorph corresponding to said crystals from the solution at a temperature between about 15 and about 40° C. and a pH below about 0.6, and separating the crystallized enantiomorph from the resulting slurry within about 10 to about 60 minutes following initiation of crystallization to terminate crystallization within a period of time not substantially greater than that in which resolution reaches a maximum and to prevent contamination of the seeded enantiomorph by spontaneous crystallization of its enantiomer.

12. A process for resolving DL-glutamic acid hydrochloride which comprises preparing an aqueous solution thereof containing DL-glutamic acid hydrochloride at a concentration between about 30 and about 60% greater than the saturation level, adding thereto between about 25 and about 50% of L-glutamic acid hydrochloride crystals based on the weight of L-glutamic acid hydrochloride in the solution, crystallizing L-glutamic acid hydrochloride from the solution at a temperature between about 20 and about 30° C. and at a pH below about 0.6, and separating the L-glutamic acid hydrochloride crystals from the resulting slurry within about 10 to about 60 minutes following initiation of crystallization to terminate crystallization within a period of time not substantially greater than the time in which maximum resolution is reached and to prevent contamination of the L-glutamic acid hydrochloride by spontaneous crystallization of D-glutamic acid hydrochloride.

13. A process for resolving a DL-glutamic acid compound selected from the group consisting of DL-glutamic acid, DL-glutamic acid hydrochloride, and DL-glutamic acid hydrobromide, which comprises adding seed crystals of said glutamic acid compound in one of its optically active forms to an aqueous solution containing said DL-glutamic acid compound at a supersaturation of at least about 10%, based on the saturation level, the proportion of seed crystals being at least about 1% by weight of the seeded enantiomorph in the solution in the case of solutions of the said DL-glutamic acid hydrohalides wherein the corresponding hydrogen halide is present in free form, and at least about 5% by weight of the seeded enantiomorph in the solution in the case of solutions containing said DL-glutamic acid compound without free hydrogen halide; crystallizing therefrom the enantiomorph corresponding in optical activity to the seed crystals to the extent possible without spontaneous crystallization of any substantial proportion of the enantiomer, separating the resulting crystals, and thereafter crystallizing glutamic acid compound of the opposite optical activity therefrom in substantially pure form.

14. A process for resolving DL-glutamic acid hydrochloride which comprises adding crystals of D-glutamic acid hydrochloride to an aqueous solution containing DL-glutamic acid hydrochloride at a supersaturation between about 10 and about 100%, based on the saturation level, the proportion of seed crystals being at least about 5% by weight of the seeded enantiomorph in the solution, crystallizing D-glutamic acid hydrochloride from said solution over a period of about 10 to about 60 minutes until the supersaturation thereof is exhausted to the extent possible without spontaneous crystallization of any substantial proportion of L-glutamic acid hydrochloride, separating the crystallized material, and thereafter crystallizing L-glutamic acid hydrochloride in substantially pure form from the remaining solution.

15. A cyclic process for resolving a DL-glutamic acid compound selected from the group consisting of DL-glutamic acid, DL-glutamic acid hydrochloride, and DL-glutamic acid hydrobromide which comprises adding crystals of said glutamic acid compound in one of its optically active forms to an aqueous solution containing said DL-glutamic acid compound at a supersaturation between about 10 and about 100%, based on the saturation level, the proportion of seed crystals being at least about 5% by weight of the seeded enantiomorph in the solution, crystallizing therefrom over a period of about 10 to about 60 minutes the enantiomorph corresponding in optical activity to the added crystals without spontaneous crystallization of any substantial proportion of the enantiomer, separating the crystallized material from the resulting slurry, crystallizing glutamic acid compound of opposite optical activity from the remaining solution, separating the latter crystallized material from the resulting slurry, leaving a substantially racemic solution, subjecting one of the crystalline materials to racemization, and recycling the racemic solution and racemate to further resolution according to the defined procedure.

References Cited in the file of this patent

UNITED STATES PATENTS

| 2,683,739 | Weidman | July 13, 1954 |
| 2,734,919 | Amiard et al. | Feb. 14, 1956 |

FOREIGN PATENTS

| 2,972–56 | Japan | Apr. 20, 1956 |

OTHER REFERENCES

Gilman: Organic Chem. (2nd ed.), vol. I (1938), pages 254–5.

Houben: Die Methoden der Org. Chem., vol. 2 (1943), page 1065.